United States Patent
Foege et al.

(10) Patent No.: US 9,228,624 B2
(45) Date of Patent: Jan. 5, 2016

(54) FRICTION MATERIAL

(75) Inventors: Volker Foege, Bad Ischl (AT); Manuel Eder, Timelkam (AT)

(73) Assignee: Miba Frictec GmbH, Roitham (AT)

( * ) Notice: Subject to any disclaimer, the term of this patent is extended or adjusted under 35 U.S.C. 154(b) by 0 days.

(21) Appl. No.: 13/979,460

(22) PCT Filed: Jan. 12, 2012

(86) PCT No.: PCT/AT2012/050006
§ 371 (c)(1),
(2), (4) Date: Jul. 12, 2013

(87) PCT Pub. No.: WO2012/094691
PCT Pub. Date: Jul. 19, 2012

(65) Prior Publication Data
US 2013/0288003 A1 Oct. 31, 2013

(30) Foreign Application Priority Data
Jan. 13, 2011 (AT) .................................. 41/2011

(51) Int. Cl.
*F16D 69/02* (2006.01)
*F16D 69/00* (2006.01)
*F16D 13/72* (2006.01)

(52) U.S. Cl.
CPC .............. *F16D 69/00* (2013.01); *F16D 13/72* (2013.01); *F16D 69/02* (2013.01); *F16D 69/026* (2013.01); *F16D 2069/004* (2013.01); *F16D 2200/0069* (2013.01); *F16D 2200/0073* (2013.01); *F16D 2250/0046* (2013.01); *F16D 2300/10* (2013.01); *Y10T 428/24355* (2015.01); *Y10T 428/24372* (2015.01)

(58) Field of Classification Search
None
See application file for complete search history.

(56) References Cited

U.S. PATENT DOCUMENTS

| 4,256,801 | A | * | 3/1981 | Chuluda | D21H 11/12 162/146 |
| 4,267,912 | A | * | 5/1981 | Bauer | F16D 23/025 192/107 M |
| 4,351,885 | A | * | 9/1982 | Depoisier | F16D 65/127 188/251 M |
| 4,828,089 | A | * | 5/1989 | Collins | F16D 13/52 188/251 A |

(Continued)

FOREIGN PATENT DOCUMENTS

| CN | 201016371 Y | 2/2008 |
| DE | 29 40 124 A1 | 4/1980 |

(Continued)

OTHER PUBLICATIONS

NPL on Ra and Rz. "Interpretation of "Rz =4×Ra" and other roughness parameters in the evaluation of machined surfaces", Palasti-Kovacs et al., published in Mar. 2012.*

(Continued)

*Primary Examiner* — Aaron Austin
*Assistant Examiner* — Zheren J Yang
(74) *Attorney, Agent, or Firm* — Collard & Roe, P.C.

(57) ABSTRACT

The invention relates to a friction element (1), comprising a main body (2) having a friction layer (5), characterized in that the friction layer (5) has an arithmetic average roughness value Ra according to DIN EN ISO 4287 between 3 µm and 10 µm, a wave depth Wt according to DIN EN ISO 4287 of at least 30 µm and a mean groove width Rsm according to DIN EN ISO 4287 of at least 150 µm. Pores of the friction layer have a pore size which is selected from a range with a lower limit of 25 µm and an upper limit of 900 µm.

22 Claims, 1 Drawing Sheet

(56) References Cited

U.S. PATENT DOCUMENTS

| | | | |
|---|---|---|---|
| 4,832,185 A | 5/1989 | Huber | |
| 4,951,798 A * | 8/1990 | Knoess | F16D 23/025 192/107 M |
| 5,337,872 A * | 8/1994 | Kawamura | F16D 23/025 192/107 M |
| 5,407,043 A * | 4/1995 | Yamada | F16D 23/025 192/107 M |
| 5,433,774 A * | 7/1995 | Kapl | F16D 69/028 106/36 |
| 5,453,317 A * | 9/1995 | Yesnik | C08J 5/04 442/104 |
| 5,516,587 A * | 5/1996 | Tanaka | F16D 13/64 188/251 A |
| 5,585,166 A | 12/1996 | Kearsey | |
| 5,856,244 A * | 1/1999 | Lam | C04B 30/02 427/201 |
| 5,900,559 A * | 5/1999 | Nakamura | B22F 3/24 192/107 M |
| 5,958,507 A * | 9/1999 | Lam | C04B 30/02 427/203 |
| 5,964,334 A * | 10/1999 | Shimoda | F16D 35/00 192/107 M |
| 5,975,270 A * | 11/1999 | Tokune | F16D 13/64 192/107 |
| 6,001,750 A * | 12/1999 | Lam | C04B 30/02 442/153 |
| 6,013,696 A * | 1/2000 | Hill | F16D 69/00 428/311.71 |
| 6,135,258 A * | 10/2000 | Rommeru | F16D 69/026 192/107 M |
| 6,158,561 A * | 12/2000 | Sakai | F16D 13/648 192/107 M |
| 6,311,815 B1 * | 11/2001 | Riggle | F16D 13/64 192/107 M |
| 6,316,083 B1 | 11/2001 | Kawabata et al. | |
| 6,524,681 B1 * | 2/2003 | Seitz | D06N 7/00 104/18 |
| 6,848,933 B1 | 2/2005 | Delaney, III et al. | |
| 7,294,388 B2 * | 11/2007 | Lam | F16D 69/026 188/251 A |
| 7,677,375 B2 * | 3/2010 | Ando | F16D 13/64 192/107 M |
| 7,867,596 B2 * | 1/2011 | Komori | C04B 30/02 192/107 M |
| 7,886,885 B2 * | 2/2011 | Mordukhovich | F16D 13/64 192/107 C |
| 7,914,871 B2 * | 3/2011 | Unno | F16D 69/026 106/36 |
| 8,167,107 B2 * | 5/2012 | Schrader | F16D 13/72 192/107 M |
| 8,398,491 B2 * | 3/2013 | Saeki | F16F 15/129 192/107 C |
| 2003/0106759 A1 | 6/2003 | Sakai | F16D 13/648 192/35 |
| 2003/0217904 A1 * | 11/2003 | Ando | F16D 27/115 192/107 M |
| 2004/0256195 A1 * | 12/2004 | Fujimaki | F16D 13/64 192/107 M |
| 2005/0064778 A1 * | 3/2005 | Lam | F16D 69/02 442/59 |
| 2008/0138578 A1 * | 6/2008 | Kienzle | C04B 35/573 428/141 |
| 2008/0146474 A1 * | 6/2008 | Takahashi | C10M 141/10 508/390 |
| 2008/0196995 A1 * | 8/2008 | Mikami | C10M 169/00 192/41 R |
| 2008/0277234 A1 * | 11/2008 | Holderied | F16D 23/025 192/107 M |
| 2009/0032361 A1 * | 2/2009 | Nakano | F16D 13/64 192/107 M |
| 2009/0047197 A1 * | 2/2009 | Browne | F16D 28/00 422/307 |
| 2009/0166157 A1 | 7/2009 | Krätz et al. | |
| 2009/0277298 A1 * | 11/2009 | Mayr | 74/606 A |
| 2010/0078287 A1 * | 4/2010 | Gaffney | F16D 69/026 192/107 M |
| 2010/0130291 A1 * | 5/2010 | Ando | B60K 17/22 464/162 |
| 2011/0189460 A1 * | 8/2011 | Chavdar | F16D 69/026 428/292.1 |
| 2011/0272238 A1 * | 11/2011 | Basu | B32B 15/08 192/107 M |
| 2013/0118858 A1 * | 5/2013 | Mordukhovich | F16D 13/52 192/107 M |
| 2013/0161144 A1 * | 6/2013 | Ohr | F16D 13/64 192/70.11 |

FOREIGN PATENT DOCUMENTS

| | | | |
|---|---|---|---|
| DE | 197 36 188 A1 | 3/1998 | |
| DE | 10035489 A1 * | 1/2002 | C22C 18/00 |
| DE | 10 2004 060 016 A1 | 6/2006 | |
| DE | 10 2005 046 763 A1 | 4/2007 | |
| EP | 0 300 128 A1 | 1/1989 | |
| EP | 0 669 482 A2 | 8/1995 | |
| EP | 0 823 565 A2 | 2/1998 | |
| EP | 1 991 646 B1 | 11/2008 | |
| JP | 2000-154260 A | 6/2000 | |
| JP | 2004169788 A * | 6/2004 | |
| JP | 2004-331270 A | 11/2004 | |
| JP | 2005233264 A * | 9/2005 | |
| WO | WO 2007/043961 A1 | 4/2007 | |
| WO | WO 2010103369 A1 * | 9/2010 | F16D 69/025 |

OTHER PUBLICATIONS

NPL on Ra and Rz. "Interpretation of Rz=4×Ra and other roughness parameters in the evaluation of machined surfaces," Palasti-Kovacs et al., published in Mar. 2012.*
Machine translation of DE 10035489 B4, obtained using Google Patent on Mar. 7, 2015.*
International Search Report of PCT/AT2012/050006, date of mailing Sep. 18, 2013.

* cited by examiner

FRICTION MATERIAL

CROSS REFERENCE TO RELATED APPLICATIONS

This application is the National Stage of PCT/AT2012/050006 filed on Jan. 12, 2012, which claims priority under 35 U.S.C. §119 of Austrian Application No. A 41/2011 filed on Jan. 13, 2011, the disclosure of which is incorporated by reference. The international application under PCT article 21(2) was not published in English.

The invention relates to a friction element comprising a main body with a friction layer, a friction assembly comprising at least two friction elements, which can be brought into operative connection with one another and which are lubricated with a water-based lubricant, as well as the use of a water-based lubricant and coolant.

Currently in wet-running multidisc couplings or brakes various different friction materials are used in connection with mineral oil-based or synthetic oils for cooling the friction surfaces. The technical standard in this case is very high in that the friction materials, the oils or mostly both components, are tailored very specifically to the respective application. Further developments in the direction of alternative lubricants tend to be the exception, whereas as oil-based lubricants, in which the potential has already been partly exhausted, have increasing amounts of additives added to them involving considerable effort and high costs, and the latter are mostly associated with negative effects on the already poor environmental compatibility of the system. An additional negative side effect of oil-based lubricants is the heavy dependency on the oil industry.

Water-based lubricating systems have already been described in the prior art. Thus for example U.S. Pat. No. 4,828,089 A describes a brake or a coupling with a pyrolytically produced carbon friction material, which is cooled directly by water or a glycol water solution.

In principle, water is mentioned as the fluid for wet friction applications in EP 0 823 565 A2, but this is not discussed in depth and the examples given therein are for oil-lubricated systems.

From EP 1 991 6436 B1 a gear system is known which contains a mixture of water and glycol or the like in which graphite particles are suspended. Preferably, the mixture contains 40 to 60 weight percent glycol and 2 to 25 weight percent graphite in the form of flaked graphite particles with a grain size of less than 12 residual water and additional admixtures and/or additives.

The objective of the present invention is to improve a single or multiple synchronization or to provide a distributor gear.

Said objective is achieved on the one hand by the aforementioned friction element, in which the friction layer has a mean arithmetic roughness value Ra according to DIN EN ISO 4287 of at least 3 µm, a wave trough depth Wt according to DIN EN ISO 4287 of at least 30 µm and a mean groove width RSm according to DIN EN ISO 4287 of at least 150 µm, and on the other hand by a friction assembly which comprises such a friction element.

Furthermore, the objective of the invention is achieved by using a mixture of water and at least one aliphatic hydrocarbon comprising at least two hydroxyl groups, in which solid lubricant particles with a grain size of a maximum of 50 µm are dispersed, for a friction element in a single or multiple synchronization or in a distributor gear system.

Surprisingly, during the testing of the lubricant and coolant described in EP 1 991 646 B1-EP 1 991 646 B1 forms part of the disclosure of the present description with regard to the composition of this lubricant and coolant—it was found for friction applications that the water-based lubricant and coolant not only has the anticipated effect as a lubricant and coolant, but the latter has essential advantages in couplings and in synchronizations by reducing power losses from the engine in the open position at differential speed and by providing a greater transmissible friction moment in the closed position. Furthermore, it was revealed that although EP-B1 suggests that structural changes are not necessary a further improvement is obtained if the aforementioned parameters of surface configuration of the friction layer are adhered to, i.e. the friction layer has a heavily structured surface. This is substantiated in that by means of this roughly structured surface solid lubricant particles, which are contained in the lubricant and coolant, can be incorporated into the surface of the friction layer, whereby the static friction caused by the adhesion effect of the water on the friction layer can be reduced.

It is surprising in this case that by means of the roughly structured surface although the contact surface is reduced relative to the counter friction surface the aforementioned improvement is still achieved in the closed position.

Although, it is possible in principle that the friction layer is formed by the main body of the friction element, for example in that the friction element is produced by a sintering process and the surface structuring is formed by a suitably shaped surface of the mold or in a subsequent calibrating step by a calibrating die with a suitably shaped surface, the friction layer is preferably formed by a friction lining, as the surface configuration of friction linings, particularly if the latter comprise a woven or unwoven fiber material, owing to the greater elasticity of these materials is easier and less expensive to achieve. Even if the friction linings are formed by a metallic coating on the main body, the advantage is that the main body itself can remain unchanged so that previously used main bodies can continue to be used.

Preferably, the friction layer has a coefficient of friction against steel on wetting with a water/glycol mixture which is selected from a range with a lower limit of 0.06±10% and an upper limit of 0.4±10%. In other words the friction layer preferably has a relatively high coefficient of friction on the one hand and on the other hand has a coefficient of friction which fluctuates only slightly so that the high level of the coefficient of friction is almost constant within narrow limits. In this way it is achieved that the contact area of the friction layer can be reduced further under at least approximately uniform friction so that the friction layer can have an even rougher structure for incorporating solid lubricant particles.

According to another embodiment variant the friction layer has a coefficient of friction which is influenced by temperature fluctuations and/or pressure fluctuations (specific pressure caused by the shift force) and/or speed fluctuations by a maximum of ±10%. This prevents the coefficient of friction of the friction layer being reduced as a result of changes in environmental conditions—usually the coefficient of friction is reduced with increasing temperature. Consequently, the advantage is that the contact area of the friction layer can be relatively small in relation to the entire surface of the friction layer. In addition, by means of the relative independence of the coefficient of friction from pressure fluctuations and speed fluctuations the level of friction is independent of the driver's behavior.

In particular, according to one embodiment variant the coefficient of friction within a fluctuation range of 0.01 to 0.1 (relative to the coefficient of friction) is independent of temperature fluctuations and/or pressure fluctuations and/or speed fluctuations.

It is an advantage with regard to reducing the contact area of the friction layer if the friction layer wears after 20,000 shift cycles by a maximum of 50 μm, as in this way a high lifetime of the friction element is achieved even with a reduced, effective friction surface, or with friction elements compared to the prior art the contact area can be reduced at constant friction.

It is also possible that the friction layer has a degree of compressibility, which is selected from a range with a lower limit of 5% and an upper limit of 50%. By keeping the elasticity of the friction layer within this range water adhering to the surface of the friction layer is squeezed out more effectively under the load of the friction layer in interaction with the solid lubricant particles incorporated into the friction layer.

It is an advantage if to improve this effect further the friction layer has a free volume of at least 20%.

The pores of the friction layer can have a pore size which is selected from a range with a lower limit of 20 μm and an upper limit of 900 μm, whereby the incorporation of solid lubricant particles into said pores is made possible, and at the same time it is possible to prevent water from collecting in said pores and the water content in the pores can be reduced.

It is an advantage if the friction layer has a proportion of solid lubricant, in particular a proportion of graphite, of at least 5 wt. %, as it could be established that although with particles of solid lubricant below this level a level of friction can be reached by the friction layer which meets requirements, with a proportion of solid lubricant above 5 wt. % the friction level increases disproportionally. By means of the already existing amount of solid lubricant in the friction layer the adhesion of water to the friction lining can be reduced.

It is an advantage in this case if the amount of solid lubricant in the friction lining is selected from a range with a lower limit of 5 wt. % and an upper limit of 50 wt. %, as above 50 wt. % the friction level of the friction layer increases but not by the expected amount.

The solid lubricant particles in the friction lining preferably have a maximum grain size of 500 μm. The maximum grain size refers to the greatest dimension of the particles, regardless of whether solid lubricant particles with a platelet structure are used or not. In other words this value is not restricted to a specific dimension. In this way the incorporation of the solid lubricant particles into the friction layer is improved, in particular into the pores of the friction layer, in particular the proportion of particles and the layering of particles in the friction layer can be improved.

In order to improve these effects the solid lubricant particles have solid lubricant grains with a grain size distribution within a range of 0.01 μm to 50 μm.

Preferably, the friction lining comprises a proportion of resin which is selected from a range with a lower limit of 15 wt. % and an upper limit of 60 wt. %. Below 15 wt. % resin the friction lining is too soft so that the latter has an elasticity, which—as shown during investigations—is too great for the use of a water-containing lubricant and coolant. Above 60 wt. % resin the elasticity is no longer sufficient to remove water bonded adhesively to the friction lining during the friction loading of the friction element from the friction lining, at least largely, in a reliable manner. Furthermore, with a proportion of resin of over 60 wt. % the porosity of the friction lining reduces to a value which is no longer sufficient to incorporate a sufficiently large amount of solid lubricant particles from the lubricant and coolant.

In the preferred embodiment of the friction lining the latter has a carbon fiber matrix, as in this way the friction lining with regard to its main properties already has a lower tendency to adhere to water.

The friction lining for further improving the properties of the friction lining preferably has a proportion of carbon, which is selected from a range with a lower limit of 30 wt. % and an upper limit of 85 wt. %.

According to another embodiment variant, the friction layer is provided with an adhesion-reducing coating, whereby the effect of the reduced adhesion of water from the lubricant and coolant to or into the friction layer can be supported or improved.

With regard to the reduction of the effective area of the friction element, i.e. the contact area, it is an advantage if the adhesion-reducing coating has a Vickers hardness of a maximum of HV(1) 400, as in this way the coating rubs off in the area of the contact area during the operation of the friction element, i.e. there is no worsening in the effect of the friction element, i.e. the friction layer, as the coating is still provided in the "troughs" between the "peaks" of the friction lining, and its effect of reducing the adhesion of the water is realized.

In the preferred embodiment the adhesion-reducing coating is formed by a silicone coating, a DLC coating, a chromium-nitrite coating or a bonded coating, as the latter are simple to provide, for example by spraying, and also with these substances no negative effect is expected on the lubricant or coolant.

For the above reasons, namely that the coating will partly rub off during operation, it is preferable if the thickness of the layer of adhesion-reducing coating is a maximum of 6 μm. In addition, by keeping to this limit of layer thickness the incorporation or depositing of solid lubricant particles from the lubricant or coolant is not influenced or not influenced negatively.

For the above reasons the contact area, which is in direct contact with an additional friction element when in use, has a size which is maximum of 40% of the total area of the friction layer.

According to one embodiment variant of the friction assembly the additional friction element has a mean arithmetic roughness value Ra according to DIN EN ISO 4287, which is selected from a range with a lower limit of 4 μm, preferably 5 μm and an upper limit of 8 μm, preferably 7 μm. On the one hand, by maintaining the lower limit the displacement of lubricant and coolant from the friction area is improved during the friction loading of the two friction elements, on the other hand, by maintaining the upper limit a high level of friction of the friction assembly is achieved despite the small contact area of the first friction element, in particular there is no or only a small dependency on the contact area in the second friction element, i.e. a reduction in the friction level can be prevented by the contacting of a "peak" of the friction layer of the second friction element with a "trough" of the friction layer of the first friction element, in which solid lubricant particles are provided, which would cause a reduction in friction.

Preferably, the additional friction element has a surface hardness which is selected from a range with a lower limit of HV(1) 180 and an upper limit of HV(1) 600, in order to reduce the compressibility of the friction layer of the additional friction element, whereby the friction level can also be improved even with the small contact area of the first friction element.

For this purpose it is also possible that the additional friction element is provided with a hard layer having a Vickers hardness of at least HV(1) 400.

For a better understanding of the invention the latter is explained in more detail with reference to the following Figures.

In a partly schematically simplified representation:

First of all, it should be noted that details relating to positions used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Figure 1:
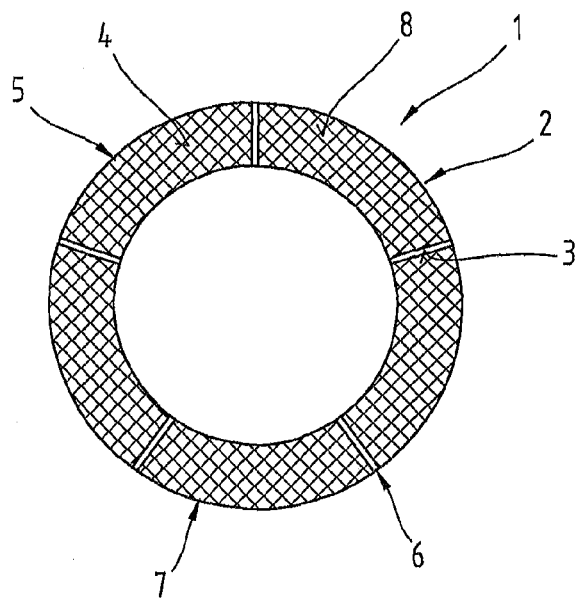
FIG. 1 shows a friction element.

FIG. 1 shows a friction element 1 in the form of a so-called friction disc.

In principle friction discs of this kind are known from the prior art. The form shown in FIG. 1 is only a representation of various different embodiments of the geometry which are adapted to the respective application. As this is known to a person skilled in the art reference is made to the relevant literature.

Furthermore, the friction element 1 can also be synchronizer ring or a double cone synchronizer ring.

The friction elements 1, i.e. for example friction discs, are used for example for single and multiple synchronizations, uncontrolled and controlled distributor gears, brakes, couplings, differential locks, torque vectoring applications, etc. For this the friction element 1 is arranged with an additional friction element so that during the activation of the respective device the friction element 1 enters into frictional engagement with the additional friction element. The number of friction elements 1 and additional friction elements—which can possibly also be formed by the friction elements 1, but are normally made of different materials than the friction elements 1—is not restricted to two, but is dependent on the level of friction required. For example in each packet three, four, five, six, seven, eight, nine, ten to twenty etc. friction elements can be combined to form a friction assembly, for example in a so-called disc packet.

Torque vectoring applications are for example applications in driving dynamics in which, for example, the speed differences of a limited slip differential are increased by this system. In this way for example it is possible to support the steering of a vehicle in that the drive moments are distributed unequally to the wheels. In this way a higher moment can be directed to the outer wheel, so that in normal driving conditions oversteer can be adjusted.

In the preferred form of the invention the friction element 1 is used in single and multiple synchronizations and in uncontrolled and controlled distributor gears.

The friction element 1 comprises a main body 2, which is provided with a friction layer 5 on a front and/or rear surface 3, 4, i.e. on at least one of said surfaces 3, 4. The friction layer 5 can extend continuously over the circumference of the main body 2 or only be arranged partially thereon, for example in that the friction layer 5 is divided by grooves 6 into segments 7, wherein said grooves 6 can also be formed in the friction layer 5 itself. The number of segments 7 or grooves 6 relates to the respective application. The represented number should thus not be considered to be restrictive. Essentially the friction layer 5 forms a circular ring or a circular ring interrupted by grooves 6, whereby also geometric forms other than a circular ring shape are possible.

The main body 2 itself can be made from a solid material or sintered material. For example, the main body 2 is made of steel or sintered steel, and other metals or metal alloys can also be used, such as for example brasses etc.

The friction layer 5 can be made from the material of the main body 2, preferably however a separate friction lining is attached to the main body 2 and joined to the latter. For example, the friction lining can be formed by a metal coating, such as e.g. (sintered)bronzes, iron, copper, nickel alloys, a non-metallic, in particular inorganic, coating, such as e.g. a ceramic made of $Al_2O_3$ or $SiO_2$, and/or an inorganic coating, possibly on a carrier, in particular paper. The organic coating can be formed by a resin or a resin mixture, for example a phenolic resin, a melamine resin, an amide resin, an amide-imide resin, an epoxy resin, a silicone resin, as well as mixtures thereof, where preferably a phenolic resin(mixture) is used. Preferably, the resin is reinforced by fibers, for example glass fibers, mineral fibers, such as e.g. basalt fibers, or in particular carbon fibers. If coatings are used as friction linings on the main body 2 the latter can be applied directly, for example in the case of metal coatings, or joined by an adhesive, for example in the case of paper linings or other resin-impregnated linings. If necessary, also friction particles such as e.g. $Al_2O_3$ or $SiO_2$, etc., and/or solid lubricant particles, such as e.g. graphite, $MoS_2$, hexagonal BN, PTFE, etc. can be used in the friction layer 5 or the friction lining.

The proportion of resin in the friction lining can be selected from a range with a lower limit of 15 wt. % and an upper limit of 60 wt. %, in particular from a range with a lower limit of 25 wt. % and an upper limit of 50 wt. %, preferably from a range with a lower limit of 25 wt. % and an upper limit of 40 wt. %.

The proportion of carbon in the friction lining can be selected from a range with a lower limit of 1 wt. % and an upper limit of 85 wt. %, in particular from a range with a lower limit of 10 wt. % and an upper limit of 70 wt. %, preferably from a range with a lower limit of 30 wt. % and an upper limit of 50 wt. %.

As already explained above the friction element 1 is used in a wet application, where a water-containing or water-based mixture is used as the lubricant and coolant. In particular, a lubricant and coolant is used which is described in EP 1 991 646 B1 and which comprises a mixture of water and at least one aliphatic hydrocarbon with at least two hydroxyl groups, in which graphite particles with a grain size of a maximum of 50 μm are dispersed, as main components. Instead of graphite other solid lubricant particles can also be used, if necessary in combination with one another or with graphite, such as e.g. $MoS_2$, hexagonal BN, PTFE, etc. The proportion of aliphatic hydrocarbon in the lubricant and coolant can be between 25 wt. % and 75 wt. %, in particular between 40 wt. % and 60 wt. %, the proportion of solid lubricant particles can be between 1 wt. % and 30 wt. %, in particular between 2 wt. % and 25 wt. %. The remainder to 100 wt. % is formed by water and if necessary admixed auxiliary materials and additives, such as e.g. one or more dispersing additives, one or more defoaming agents, one or more corrosion inhibitors etc. The total proportion of said auxiliary materials and additives is a maximum of 10 wt. %, in particular a maximum of 8 wt. %, preferably a maximum of 5 wt. %. As the aliphatic hydrocarbon preferably a glycol or glycol mixture is used with 2 to 10 hydrocarbons, such as e.g. ethylene glycol, propylene glycol, triethylene glycol, or polymers thereof, such as e.g. polyethylene glycol. In the preferred embodiment the aliphatic hydrocarbon is soluble in water.

Figure 2:
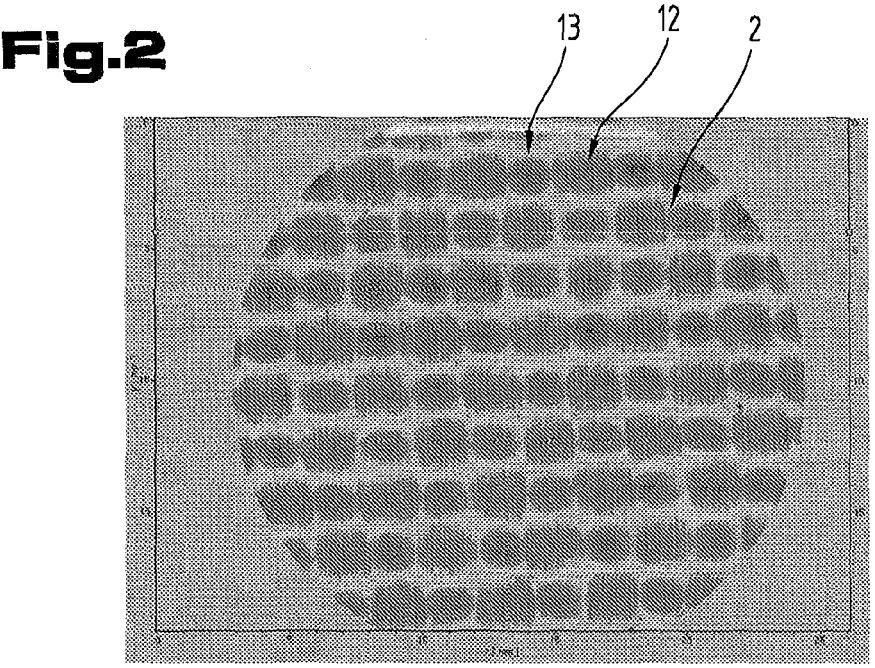
FIG. 2 shows an image of the surface structure of a section of the friction layer of a friction element.
Figure 3:
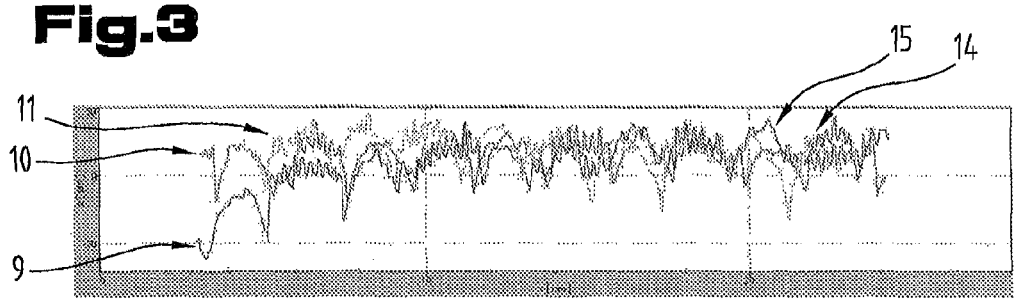
FIG. 3 shows the roughness profile of the surface according to FIG. 2.

According to the invention a surface 8 of the friction layer 5, i.e. in particular of the friction lining, is configured to be heavily structured. FIGS. 2 and 3 show an example of such a structured surface 8. FIG. 2 shows a so-called relief image, which shows the shadow length of the shadows of the uneven surface on the height profile, FIG. 3 shows the roughness profile of said surface area, wherein line 9, line 10 and line 11 each show different topography lines of the surface.

The image was made of a friction lining with the composition 25 wt. % resin and 75 wt. % carbon fibers.

As shown clearly in FIG. 2 the surface has a web structure with raised areas 12 and depressed areas 13. The roughness profile according to FIG. 3 thus shows wave troughs 14 and peaks 15. In a specific case for said friction lining a mean arithmetic roughness value Ra according to DIN EN ISO 4287 was measured to be 4.379 μm, a trough depth Wt according to DIN EN ISO 4287 was 48.14 μm and a mean groove width RSm according to DIN EN ISO 4287 was at least 332.8 μm.

In general, the friction layer 5 according to the invention has a mean arithmetic roughness value Ra according to DIN EN ISO 4287 of at least 3 μm, a trough depth Wt according to DIN EN ISO 4287 of at least 30 μm and a mean groove width RSm according to DIN EN ISO 4287 of at least 150 μm. In particular, the mean arithmetic roughness value Ra according to DIN EN ISO 4287 can be between 3 μm and 10 μm and/or the mean trough depth Wt according to DIN EN ISO 4287 can be between 30 μm and 700 μm and/or the mean groove width RSm according to DIN EN ISO 4287 can be between 150 μm and 3000 μm.

Friction linings with varying surface topography were produced for this on a disc and their frictional behavior was examined in a friction assembly with a steel disc as a counter disc with the use of a water/glycol/graphite mixture. The results are summarized in Table 1. The examinations were performed on friction linings with the composition 30 wt. % resin and 70 wt. % fibers with the composition 20 wt. % cotton fibers, 17 wt. % aramide fibers, 28 wt. % celite, 15 wt. % acrylic fibers, 15 wt. % carbon fibers and 5 wt. % graphite, where the latter details relate to the fibers themselves, (Examples 1 to 5) or friction linings with the composition 30 wt. % resin and 70 wt. % carbon fibers (Examples 6 to 8). In general, the composition of the friction lining can be selected from 10 wt. %-40 wt. % cotton fibers and/or 5 wt. %-35 wt. % aramide fibers and/or 5 wt. %-65 wt. % celite and/or 5 wt. %-25 wt. % acrylic fibers and/or 5 wt. %-25 wt. % carbon fibers and/or 5 wt. %-65 wt. % graphite. The abbreviation ok means a positive result and not ok means a negative result.

TABLE 1

| Example | Ra [μm] | Wt [μm] | RSm [μm] | Result |
|---|---|---|---|---|
| 1 | 3 | 250 | 1300 | ok |
| 2 | 1.5 | 250 | 1300 | not ok |
| 3 | 3 | 500 | 2500 | ok |
| 4 | 5 | 500 | 2500 | ok |
| 5 | 5 | 750 | 3500 | not ok |
| 6 | 4.5 | 50 | 330 | ok |
| 7 | 2.5 | 30 | 150 | ok |
| 8 | 1.5 | 20 | 100 | not ok |

The structure of the surface of the friction layer 5 can be obtained or adjusted by corrugation, grooving, pressing, the density of the fabric, the type of fabric used, mechanical postprocessing (grinding, stamping), the fiber texture (web width), etc. of the friction lining.

Preferably, the contact area of the friction layer 5, which is in direct contact with the additional friction element during frictional engagement, is a maximum of 40%, in particular a maximum of 30%, of the total area of the friction layer 5.

According to one embodiment variant, the friction layer has a coefficient of friction against steel with wetting with the aforementioned water/glycol mixture, which is selected from a range with a lower limit of 0.06±10%, in particular 0.08±10%, and an upper limit of 0.4±10%, in particular 0.2±10%. This is achieved in particular by the special surface structure, interactions between the fluid or its additives and the friction lining, by the in particular superficial incorporation of solid lubricants into the friction lining, in particular graphite, and by small topographical surface changes over the lifetime of the friction lining or friction element 1. In addition, examinations were carried out on the friction linings according to Table 1, the numbering being retained in the following tables. The results are summarized in Table 2.

TABLE 2

| Example | Coefficient of friction | Result |
|---|---|---|
| 1 | 0.06-0.07 | ok |
| 2 | 0.039-0.051 | not ok |
| 3 | 0.085-0.11 | ok |
| 4 | 0.09-0.13 | ok |
| 5 | 0.038-0.052 | not ok |
| 6 | 0.08-0.09 | ok |
| 7 | 0.06-0.07 | ok |
| 8 | 0.04-0.05 | not ok |

It is also preferable, if the friction layer 5 has a coefficient of friction, which is influenced by temperature fluctuations and/or pressure fluctuations and/or speed fluctuations by a maximum of ±10%, preferably within a fluctuation range of 0.01 to 0.1. This is also achieved by the measures described in the preceding paragraph.

Furthermore, the friction layer 5 should have a wear after 20,000 shift cycles of a maximum of 50 μm, in particular a maximum wear of between 5 μm and 50 μm, preferably 40 μm, as shown in Table 3. This is achieved by means of the special surface structure and because of interactions between the fluid and its additives and the friction lining, in particular by the surface incorporation of solid lubricants into the friction lining, in particular graphite.

TABLE 3

| Example | Wear [μm] | Result |
|---|---|---|
| 1 | 5-15 | ok |
| 2 | 60-80 | not ok |
| 3 | 10-20 | ok |
| 4 | 10-25 | ok |
| 5 | 60-80 | not ok |
| 6 | 40-50 | ok |
| 7 | 15-30 | ok |

Furthermore, it was found that it is an advantage if the friction layer has a compressibility, which is selected from a range with a lower limit of 5%, in particular 10%, and an upper limit of 50%, in particular 45%, wherein here a free volume of at least 25%, in particular at least 35%, relative to the whole friction lining, is advantageous, as shown in Table 4. This is achieved by the special surface structure. (The free volume is determined by the maximum water absorption of a friction lining up to saturation point).

The compressibility is determined from the change in the layer thickness in mm, which is produced when a defined coupling packet consisting of a defined number of fiber composite friction discs, for example nine, and always the same steel counter discs defined in quantity, for example ten, is compressed with a defined advance in mm/min until a defined axial testing force is achieved in Newtons, for example 20,000 N, if necessary under a preload of 200 N. For this a tension/pressuring testing machine is used, e.g. from Zwick. The aforementioned relative details about the compressibility relate to the original layer thickness of the unloaded friction lining.

TABLE 4

| Example | Compressibility [%] | Free volume [%] | Pore size [μm] | Result |
|---|---|---|---|---|
| 1 | 40-43 | 35-41 | 50-250 | ok |
| 2 | 10-15 | 20-27 | 10-170 | not ok |
| 3 | 33-37 | 31-43 | 20-500 | ok |
| 4 | 46-50 | 41-48 | 100-750 | ok |
| 5 | 55-68 | 47-58 | 140-970 | not ok |
| 6 | 10-15 | 38-42 | 35-95 | ok |
| 7 | 6-12 | 30-35 | 25-50 | ok |
| 8 | 3-8 | 25-33 | 20-40 | not ok |

It is an advantage if the pores of the friction layer 5 have a pore size, selected from a range with a lower limit of 20 μm, in particular 100 μm, and an upper limit of 900 μm, in particular 500 μm.

Although the lubricant and coolant fluid used already contains solid lubricant particles, in particular graphite, according to one embodiment variant the friction layer 5 itself already contains solid lubricant particles, as already explained. The friction lining can have a proportion of solid lubricant, in a particular proportion of graphite, of at least 5 wt.-%. Preferably, the proportion of solid lubricant in the friction lining is selected from a range with a lower limit of 5 wt. %, in particular 10 wt. %, and an upper limit of 50 wt. %, in particular 40 wt. %. Table 5 shows several selected examples of the proportions of solid lubricant in the friction lining.

TABLE 5

| Example | Solid lubricant | Proportion [wt. %] | Grain size [μm] | Result |
|---|---|---|---|---|
| 1 | Graphite | 10-30 | 5-25 | ok |
| 2 | Celite | 5-8 | 2-15 | not ok |
| 3 | Coke | 3-15 | 50-500 | ok |
| 4 | $MoS_2$ | 6-9 | | ok |
| 5 | Activated carbon | 3-23 | 0.5-5 | ok |
| 6 | $WS_2$ | 3-5 | 50-200 | not ok |

As also shown in Table 5, the solid lubricant particles preferably have maximum grain size of 500 μm. In particular, the solid lubricant particles have solid lubricant grains with a grain size distribution/grading curve in the range of 0.01 μm to 50 μm, in particular of 8 μm to 42 μm.

As explained above the friction layer 5 can be provided with an adhesion-reducing coating, which preferably has a Vickers hardness of a maximum of HV(1) 400. In this way with a friction lining according to the compositions described in Table 1, the adhesion of water to the friction lining could be improved by 30% to 40% compared to a friction lining without this coating. In this way the lifetime of the friction lining can be extended.

In the preferred embodiment the adhesion-reducing coating is formed by a silicone coating, a DLC coating, a chromium-nitrite-coating, or a bonded coating. In particular, a bonded coating is preferable, with a polyamide-imide resin as a matrix. According to a particularly preferred embodiment of the friction element 5 the bonded coating also contains particle-like graphite or solid lubricant, which is also contained in the lubricant and coolant, as a solid lubricant, if necessary together with a different particulate solid lubricant, in particular MoS2.

It was established that a layer thickness of the adhesion-reducing coating of a maximum of 6 μm, in particular a maximum of 5 μm, is advantageous.

The friction element according to the invention is combined in the friction assembly comprising the latter, preferably with at least one further friction element, to form a friction packet, in particular a disc packet, the mean arithmetic roughness value Ra according to DIN EN ISO 4287 of which has a value which is selected from a range with a lower limit of 4 μm and an upper limit of 8 μm. The additional friction element can be made for example from (sintered) steel and has a corresponding surface structure, which is produced for example by stamping. Instead of steel other materials can also be used for the additional friction element, such as e.g. aluminum alloys with hard coatings such as for example DLC layers, etc.

Preferably, the additional friction element has a surface hardness which is selected from a range with a lower limit of HV(1) 180, in particular HV(1) 240, and an upper limit of HV(1) 500, in particular HV(1) 350. This hardness is obtained for example, in that the surface of the additional friction element, i.e. its friction layer, is gas-nitrided, nitro-oxidated or plasmanitrided. The method parameters used for producing said "hard layers" correspond to the usual parameters used for performing this method. In particular, a hard layer can be produced with a Vickers hardness of at least HV(1) of between 300 and 1,000, which can have a layer thickness of a maximum of 20 μm. The proportion of nitrides and possibly oxidic phases in this hard layer can be for example between 5 wt. % and 85 wt. %.

By using the friction element 1 according to the invention in connection with the said water-containing lubricant and coolant in motor vehicles a significant reduction in the fuel consumption could be achieved of 4% to 6% compared to conventional oil-lubricated and oil-cooled systems. This was measured according to RL 93/116/EWG. In addition, the friction element 1 provided with the friction layer 5 according to the invention had a vibration-free noise level with a moment oscillation amplitude of in the region of ±20% of the friction moment.

The exemplary embodiments show and describe possible embodiment variants of the friction element 1 and the friction assembly, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the friction element 1 the latter and its components have not been represented true to scale in part and/or have been enlarged and/or reduced in size.

LIST OF REFERENCE NUMERALS

1 Friction element
2 Main body

3 Surface
4 Surface
5 Friction layer
6 Groove
7 Segment
8 Surface
9 Line
10 Line
11 Line
12 Area
13 Area
14 Trough
15 Peak

The invention claimed is:

1. A friction assembly comprising at least a first friction element and a second friction element, which can be moved into operative connection with one another and which are lubricated with a water-based lubricant,
   wherein the first friction element is a friction disc, a synchronizer ring, or a double cone synchronizer ring and comprises a main body with a friction layer,
   wherein the friction layer has a mean arithmetic average roughness value Ra according to DIN EN ISO 4287 between 3 μm and 10 μm, a wave trough depth Wt according to DIN EN ISO 4287 of at least 30 μm and a mean groove width RSm according to DIN EN ISO 4287 of at least 150 μm,
   wherein the friction layer has a compressibility, which is selected from a range with a lower limit of 5% and an upper limit of 50%,
   and wherein pores of the friction layer have a pore size which is selected from a range with a lower limit of 25 μm and an upper limit of 900 μm.

2. The friction assembly as claimed in claim 1, wherein the friction layer is formed by a friction lining.

3. The friction assembly as claimed in claim 1, wherein the friction layer has a coefficient of friction against steel when wetted with a water/glycol mixture which is selected from a range with a lower limit of 0.06±10% and an upper limit of 0.4±10%.

4. The friction assembly as claimed in claim 1, wherein the friction layer has a coefficient of friction, which is influenced by temperature fluctuations and/or pressure fluctuations and/or speed fluctuations by a maximum of ±10%.

5. The friction assembly as claimed in claim 4, wherein the coefficient of friction within a fluctuation range of 0.01 to 0.1 is independent of temperature fluctuations and/or pressure fluctuations and/or speed fluctuations.

6. The friction assembly as claimed in claim 1, wherein the friction layer wears after 20,000 shift cycles by a maximum of 50 μm.

7. The friction assembly as claimed in claim 1, wherein the friction layer has a free volume of at least 20%.

8. The friction assembly as claimed in claim 2, wherein the friction layer comprises a proportion of solid lubricant of at least 5 wt. %.

9. The friction assembly as claimed in claim 8, wherein the proportion of solid lubricant in the friction layer is selected from a range with a lower limit of 5 wt. % and an upper limit of 50 wt. %.

10. The friction assembly as claimed in claim 8, wherein the solid lubricant particles have a maximum grain size of 500 μm.

11. The friction assembly as claimed in claim 10, wherein the solid lubricant particles have solid lubricant grains with a grain size distribution ranging from 0.01 μm to 50 μm.

12. The friction assembly as claimed in claim 2, wherein the friction lining comprises a proportion of resin which is selected from a range with a lower limit of 15 wt. % and an upper limit of 60 wt. %.

13. The friction assembly as claimed in claim 2, wherein the friction lining has a carbon fiber matrix.

14. The friction assembly as claimed in claim 13, wherein the friction lining comprises a proportion of carbon which is selected from a range with a lower limit of 30 wt. % and an upper limit of 85 wt. %.

15. The friction assembly as claimed in claim 1, wherein the friction layer is provided with an adhesion-reducing coating.

16. The friction assembly as claimed in claim 15, wherein the adhesion-reducing coating has a Vickers hardness of a maximum of HV(1) 400.

17. The friction assembly as claimed in claim 15, wherein the adhesion-reducing coating is formed by a silicone coating, a DLC coating, a chromium-nitrite coating or a lubricant coating.

18. The friction assembly as claimed in claim 15, wherein the thickness of the layer of adhesion-reducing coating is a maximum of 6 μm.

19. The friction assembly as claimed in claim 1, wherein a contact area, which is in direct contact with the second friction element when in use, is a maximum of 40% of the total area of the friction layer.

20. The friction assembly as claimed in claim 1, wherein the second friction element has a mean arithmetic average roughness value Ra according to DIN EN ISO 4287, which is selected from a range with a lower limit of 4 μm and an upper limit of 8 μm.

21. The friction assembly as claimed in claim 1, wherein the second friction element has a surface hardness HV(1) which is selected from a range with a lower limit of 180 and an upper limit of 600.

22. The friction assembly as claimed in claim 21, wherein the second friction element is provided with a hard layer having a Vickers hardness of at least HV(1) 300.

* * * * *